US009642173B2

(12) United States Patent
Granbery

(10) Patent No.: US 9,642,173 B2
(45) Date of Patent: May 2, 2017

(54) SYSTEMS AND METHODS FOR REUSING GENERIC TOKENS USING BLUETOOTH® LOW ENERGY (BLE) BEACONS

(71) Applicant: PAYPAL, INC., San Jose, CA (US)

(72) Inventor: John Hastings Granbery, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/794,086

(22) Filed: Jul. 8, 2015

(65) Prior Publication Data

US 2016/0021687 A1    Jan. 21, 2016

Related U.S. Application Data

(60) Provisional application No. 62/024,878, filed on Jul. 15, 2014.

(51) Int. Cl.
| | |
|---|---|
| *H04W 76/02* | (2009.01) |
| *H04W 40/24* | (2009.01) |
| *H04M 17/00* | (2006.01) |
| *H04W 4/00* | (2009.01) |

(52) U.S. Cl.
CPC ....... *H04W 76/021* (2013.01); *H04M 17/305* (2013.01); *H04W 4/008* (2013.01); *H04W 40/244* (2013.01)

(58) Field of Classification Search
USPC ..................................... 455/41.2
See application file for complete search history.

(56) References Cited

U.S. PATENT DOCUMENTS

| 8,514,758 B2 * | 8/2013 | De Kimpe | H04W 52/0216 370/311 |
|---|---|---|---|
| D717,309 S | 11/2014 | Govindarajan | |
| 8,972,296 B2 | 3/2015 | Govindarajan et al. | |
| 2008/0065892 A1 * | 3/2008 | Bailey | H04L 63/0492 713/171 |
| 2009/0327135 A1 * | 12/2009 | Nguyen | G06Q 20/40 705/44 |
| 2010/0063867 A1 * | 3/2010 | Proctor, Jr. | G06Q 30/0623 455/414.1 |
| 2013/0019018 A1 * | 1/2013 | Rice | H04L 12/66 709/226 |

(Continued)

*Primary Examiner* — Nay A Maung
*Assistant Examiner* — Erica Fleming-Hall
(74) *Attorney, Agent, or Firm* — Haynes and Boone, LLC

(57) ABSTRACT

Systems and methods for reusing generic tokens using a Bluetooth® low energy (BLE) beacon. The systems and methods include a user device including a wireless transceiver, a memory for storing a generic token, and one or more processors coupled to the memory and the wireless transceiver. The wireless transceiver is configured to communicate with a beacon using a BLE communications protocol, receive a beacon identifier from the beacon, send a check in request to the beacon, and receive token differences from the beacon. The processors are configured to recreate a custom token based on the stored generic token and the received token differences. The beacon is configured to forward the check in request to a server. The server is configured to verify the user device and create the custom token and the token differences between the custom and generic tokens for return to the user device via the beacon.

20 Claims, 10 Drawing Sheets

(56) References Cited

U.S. PATENT DOCUMENTS

| | | | |
|---|---|---|---|
| 2014/0059067 A1* | 2/2014 | Ollikainen | H04L 67/306 707/758 |
| 2014/0149293 A1* | 5/2014 | Laracey | G06Q 20/108 705/44 |
| 2014/0188733 A1 | 7/2014 | Granbery | |
| 2015/0072618 A1 | 3/2015 | Granbery | |
| 2015/0073980 A1* | 3/2015 | Griffin | H04W 4/008 705/39 |
| 2015/0199672 A1* | 7/2015 | Woloshin | G06Q 20/3224 705/39 |
| 2015/0248702 A1* | 9/2015 | Chatterton | G06Q 30/0261 705/14.58 |
| 2015/0310417 A1* | 10/2015 | Syed | G06Q 20/327 705/39 |
| 2015/0332240 A1* | 11/2015 | Harwood | G06Q 20/202 705/21 |
| 2015/0356563 A1* | 12/2015 | Vohra | G06Q 20/40145 705/44 |
| 2015/0356668 A1* | 12/2015 | L'Heureux | G06Q 30/0641 705/27.1 |
| 2016/0019540 A1* | 1/2016 | Tsutsui | G06Q 20/3829 705/71 |
| 2016/0232515 A1* | 8/2016 | Jhas | G06Q 30/02 |
| 2016/0242143 A1* | 8/2016 | Lotter | G06F 21/552 |
| 2016/0277999 A1* | 9/2016 | Graves | H04W 40/244 |

* cited by examiner

SYSTEMS AND METHODS FOR REUSING GENERIC TOKENS USING BLUETOOTH® LOW ENERGY (BLE) BEACONS

RELATED APPLICATIONS

This application claims priority to provisional application No. 62/024,878, filed Jul. 15, 2014, titled "SYSTEMS AND METHODS FOR REUSING GENERIC TRANSACTION TOKENS USING BLUETOOTH LOW ENERGY (BLE) BEACONS", which is incorporated herein in its entirety by reference.

BACKGROUND

Technical Field

Embodiments disclosed herein are related to systems and methods for reusing generic tokens using a Bluetooth® low energy (BLE) beacon.

Related Art

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions to confirm and complete the sale of goods, to ship or distribute the goods to remote purchasers, and to perform other related logistics. Technology advances have also allowed for a wider variety of devices and transaction types in the retail and other marketplaces.

One example of a relatively new development within the realm of electronic commerce is the ability to allow a consumer to pay for a good or service at a point of sale through the use of his or her smart phone or other personal mobile device. A user merely needs to have an appropriate payment application or "app" on his or her device, whereupon the user can present his or her phone or other similar device at an appropriate time and location at a retail or other establishment. The retailer or other seller or service provider can then "check in" the given user through some process of reading his or her smart phone or other similar device, after which the seller or service provider can accept payment or credit through some form of communication with the checked in or acknowledged device. This "check in" ability to accept payment or credit without the use of cash, checks, credit cards, or other traditional payment means can be particularly helpful in many settings. The "check in" ability is also useful in other non-payment contexts. As an example, the "check in" ability may be used when a user approaches a venue such as a sports arena, concert hall, airport, or the like to access, retrieve, and/or present an electronic version of a ticket, boarding pass, and/or similar token in order to gain access to the venue.

Unfortunately, implementation of "check in" ability is not without its limitations. In some examples, global positioning system (GPS) or other location services of many mobile devices, such as smart phones, may be used to identify when a user is in proximity to a venue or a retail or other establishment for which the "check in" ability is available. Location services, however, are power intensive and it may not be reasonable or practical to keep these location services continuously active. In addition, retailers and other service providers with a large number of locations may involve the installation of hundreds, thousands, or even more locations that may be impractical for the user to manage and/or store on their mobile device. For example, some token management applications place a rather small, e.g., 10, upper limit on the number of locations that may be associated with individual "check in" records. In some examples, venues, retail, and/or other establishments may use one or more beacon devices to identify locations for which the "check in" ability may be available. These beacon devices, however, may have practical limitations due to numbers of users and/or available bandwidth that may limit their ability to "check in" users and distribute appropriate tokens. Accordingly, it would be advantageous to have improved systems and methods for supporting the "check in" ability.

Figure 1:
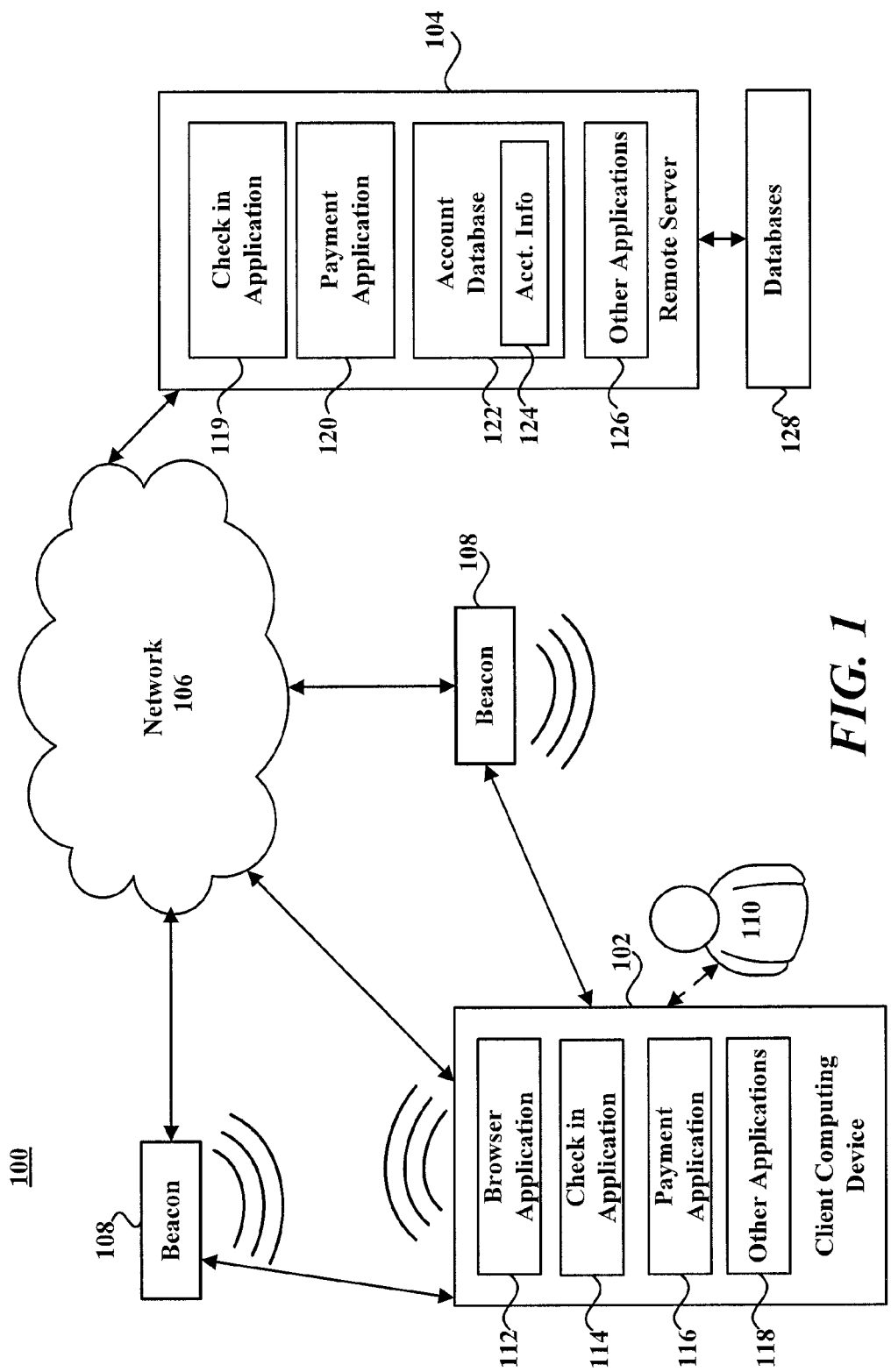
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

What is needed are systems and methods for reusing generic tokens using a beacon.

Consistent with some embodiments, there is provided a user device. The user device includes a wireless transceiver, a memory for storing a generic token, and one or more processors coupled to the memory and the wireless transceiver. The wireless transceiver is configured to communicate with a beacon using a Bluetooth® low energy (BLE) communications protocol, receive a beacon identifier from the beacon, send a check in request to the beacon, and receive token differences from the beacon. The processors are configured to recreate a custom token based on the stored generic token and the received token differences and perform an action using the custom token.

Consistent with some embodiments, there is also provided a method of managing tokens. The method includes communicating with a beacon via a wireless transceiver using a Bluetooth® low energy (BLE) communications protocol, receiving a beacon identifier from the beacon, sending a check in request to the beacon, receiving token differences from the beacon, recreating a custom token based on a generic token stored in a memory and the received token differences, and using the custom token to perform an action.

Consistent with some embodiments, there is further provided a non-transitory computer-readable medium. The non-transitory computer-readable medium includes instructions that, when executed by one or more processors, cause the one or more processors to perform a method. The method includes communicating with a beacon via a wireless transceiver using a Bluetooth® low energy (BLE) communications protocol, receiving a beacon identifier from the beacon, sending a check in request to the beacon, receiving token differences from the beacon, recreating a custom token based on a generic token stored in a memory and the received token differences, and using the received token to perform an action.

Consequently, embodiments described herein may allow a BLE beacon to facilitate a check in with a user device. The embodiments described herein may then allow the BLE beacon to obtain information associated with differences between a generic token and a custom token from a service provider for distribution to the user device. The user device may then use the differences to recreate the custom token for subsequent use. In some embodiments, the custom token may also be referred to as a pass.

FIG. 1 is a block diagram of a networked system 100, consistent with some embodiments. System 100 includes a client computing device 102 and a remote server 104 in communication over a network 106. Remote server 104 may be a payment service provider server that may be maintained by a payment service provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may further be one or more servers that hosts functionality for users to "check in" to a location, event, and the like. Checking in may provide the user that checks in with special offers, deals, and the like, and may let the merchant or other proprietor of the location or event that the user is there. The user may also check in to a location for social purposes to let friends and contacts of the user know that they are checked in. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

As shown in FIG. 1, system 100 may include one or more beacons 108. In some embodiments, beacons 108 may be installed at a merchant location, such as a store, restaurant, and the like, and other locations where user 110 may be able to check in and receive additional content, offers, features, or payment options. In some embodiments, beacons 108 may be Bluetooth™ Low Energy (BLE) beacons. BLE is a technology that transmits information at a frequency of about 2.4 GHz (about 2042-2480 MHz) over forty (40) 2-MHz wide channels, and has a range of about 50 meters or about 160 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC) and 32-bit message integrity check for robustness. Moreover, in some embodiments, BLE-capable devices may consume a fraction of the power of standard Bluetooth® devices due to the protocol allowing low duty cycles, and being designed for applications that may not require continuous data transfer. Beacons 108 may transmit one or more sequences of information such that when a device such as client computing device 102 capable of receiving information from beacons 108 comes within the range of a beacon 108, client computing device 102 may receive a transmission from a beacon 108 that may include information, data, metadata, and the like that may be displayed by client computing device 102 or used by client computing device 102 to initiate communications with beacon 108. In some embodiments, beacon 108 may be in communication with remote server 104 over network 106 through wireless or wired connection. In particular, beacon 108 may be in communication with remote server 104 over network 106. Beacon 108 may also transmit information to client computing device 102 using other wireless communication protocols, such as Bluetooth®, Near Field Communications (NFC), Radio Frequency Identification (RFID), and the like.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by user 110. For example, such instructions may include browser application 112 such as a mobile browser application, which may be used to provide a user interface to permit user 110 to browse information available over network 106, including information hosted by remote server 104. For example, browser application 112 may be implemented as a web browser to view information available over network 106. Browser application 112 may include a graphical user interface (GUI) that is configured to allow user 110 to interface and communicate with remote server 104 or other servers managed by content providers or merchants via network 106. For example, user 110 may be able to access websites to find and purchase items, as well as access user account information or web content.

Client computing device 102 may also include a check in application 114 that may allow user 110 to check in to a location using a check in platform or service such as may be provided by PayPal, Inc. of San Jose, Calif., Foursquare of New York, N.Y., Facebook, Inc., of Menlo Park, Calif., or Google+ of Google, Inc. of Mountain View, Calif., Yelp Inc. of San Francisco, Calif., or by a merchant or location, and implemented by remote server 104. In some embodiments, check in application 114 may include multiple application programming interfaces (APIs) for checking in to one or more of the check in platforms or services. In some embodiments, checking in to a location while visiting the location, such as a merchant physical storefront, may provide user with exclusive deals or offers and/or may allow user to purchase and pay for items.

Client computing device 102 may also include a payment application 116 that may be used by user 110 using client computing device 102 to make a payment. In some embodiments, payment application 116 may be configured to make a payment using remote server 104 as a payment processor. In some embodiments, functionalities provided by check in application 114 and payment application 116 may actually be provided by a single application. Client computing device 102 may include other applications 118 as may be desired in one or more embodiments to provide additional features available to user 110, including accessing a user account with remote server 104. For example, applications 118 may include interfaces and communication protocols that allow the user to receive and transmit information through network 106 and to remote server 104 and other online sites. Applications 118 may also include security applications for implementing client-side security features, programmatic client applications for interfacing with appropriate APIs over network 106 or various other types of generally known programs and/or applications. Applications 118 may include mobile applications downloaded and resident on client computing device 102 that enables user 110 to access content through the applications. The applications 118 may also include token management applications that may, for example, receive, process, manage, and/or present tokens allowing user 110 to perform transactions, present credentials, and/or the like. As an example, the Passbook application provided by Apple Inc. of Cupertino, Calif. may be a suitable token management application. In some examples, check in application 114 and the token management application may be provided in a combined application.

Remote server 104, according to some embodiments, may be maintained by an online payment provider, such as PayPal, Inc. of San Jose, Calif., which may provide processing for online financial and information transactions on behalf of user 110. Remote server 104, according to some embodiments, may also be maintained by a service that processes check ins so that a proprietor of a location, such as a merchant, or others know that user 110 is at the location or is able to provide user 110 with the ability to pay for goods using client computing device, receive offers, receive loyalty points, and/or the like. Remote server 104 may also be capable of providing access to a merchant's goods and services (collectively referred to as "items") that are for purchase and may provide a payment service processing for the purchased items. Remote server 104 may include at least check in application 119, which may be configured to interact with client computing device 102 and beacon 108 to check user 110 in to a location. In some embodiments, checking client computing device 102 in to a location may allow user 110 and client computing device 102, to access features, specials, offers, and/or the like offered by the location. In some embodiments, these features, specials, offers, and/or the like may be provided and processed by remote server 104 on behalf of the location. In some embodiments, check ins may be automatic check ins made through the communication of client computing device 102 and beacon 108, such as described in U.S. patent application Ser. No. 13/938,860, filed on Jul. 10, 2013 and issued as U.S. Pat. No. 8,972,296 on Mar. 3, 2015, and U.S. patent application Ser. No. 14/021,045, filed on Sep. 9, 2013 and published as U.S. Patent Application Publication No. 2014/0188733, the entire contents of both of these applications which are hereby incorporated by reference in their entirety.

Remote server 104 may also include a payment application 120 that may facilitate processing payments for user 110 to merchants, for example. In some embodiments, payment application 120 may be configured to interface with payment application 116 to receive payment details, user information, merchant information, and/or additional information for processing a payment on behalf of user 110. Payment application 120 may also be capable of interfacing with check in application 119 such that when a check in is processed a payment may be authorized for the location in which user 110 is checking in to. In some embodiments, functionalities provided by check in application 119 and payment application 120 may actually be provided by a single application. Remote server 104 may also include an account database 122 that includes account information 124 for users having an account on remote server 104, such as user 110. In some embodiments, payment application 120 may process payments based on information in account information 124 of account database 122. Remote server 104 may include other applications 126 and may also be in communication with one or more external databases 128, that may provide additional information that may be used by remote server 104. In some embodiments, databases 128 may be databases maintained by third parties, and may include third party account information of user 110.

As used herein, user 110 may have an account with remote server 104 such that account information 124 includes information about user 110. When user 110 checks in with remote server 104 or performs other authentication with remote server 104, client computing device 102 may be associated with user 110 such that remote server 104 recognizes client computing device 102 as being associated with user 110. In some embodiments, remote server 104 may send a cookie, token, and/or other object to client computing device 102 that provides an indication of the association between user 110 and client computing device 102.

Although discussion has been made of applications and applications on client computing device 102 and remote server 104, the applications may also be, in some embodiments, modules. Module, as used herein, may refer to a software module that performs a function when executed by one or more processors, application specific integrated circuits (ASICs), field programmable gate arrays (FPGAs), and/or other circuit having memory and at least one processor for executing instructions to perform a function, such as the functions described as being performed by the applications.

Figure 2:
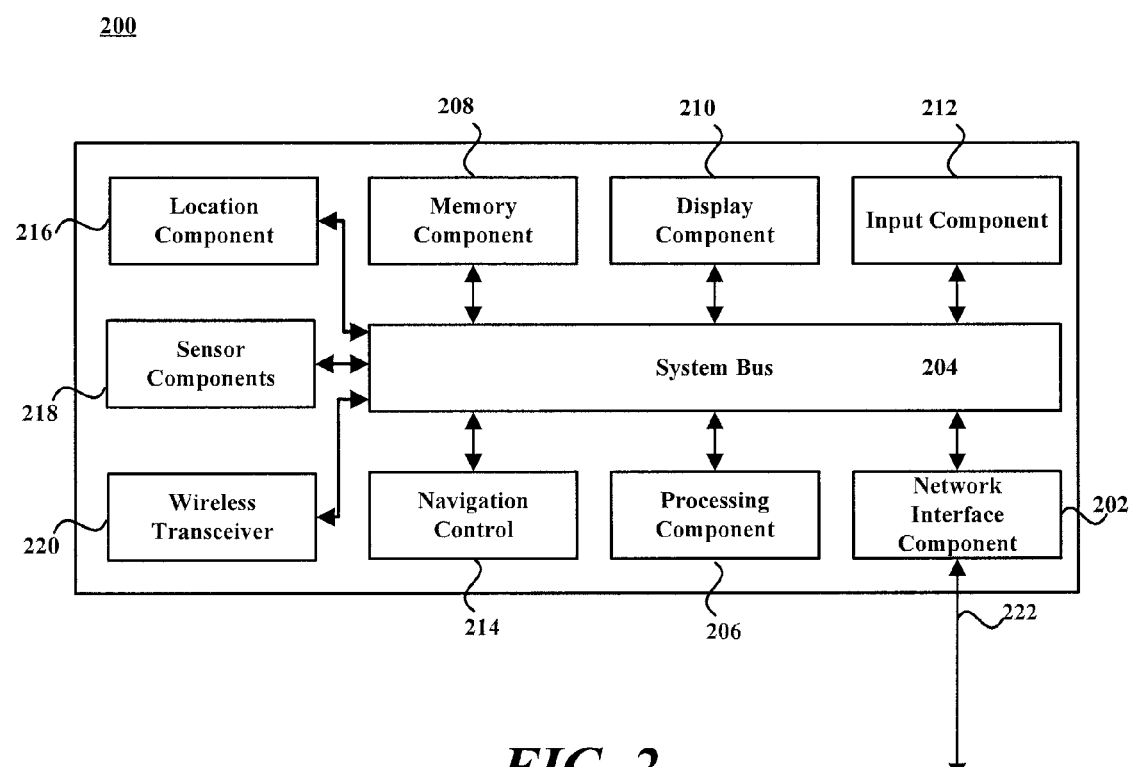
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs), digital signal processors (DSPs), ASICs, and/or FPGAs, and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as consumer 120, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 110 and/or client computing device 102 that may be associated with any actions that user 110 performs using client computing device 102. Sensor components 218 may include camera and imaging components, accelerometers, biometric readers, GPS devices, motion capture devices, and other devices that are capable of providing information about client computing device 102 or user 110, or an environment therearound. Computing system 200 may also include one or more wireless transceivers 220 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc.

Computing system 200 may perform specific operations by processing component 206 executing one or more sequences of instructions contained in memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
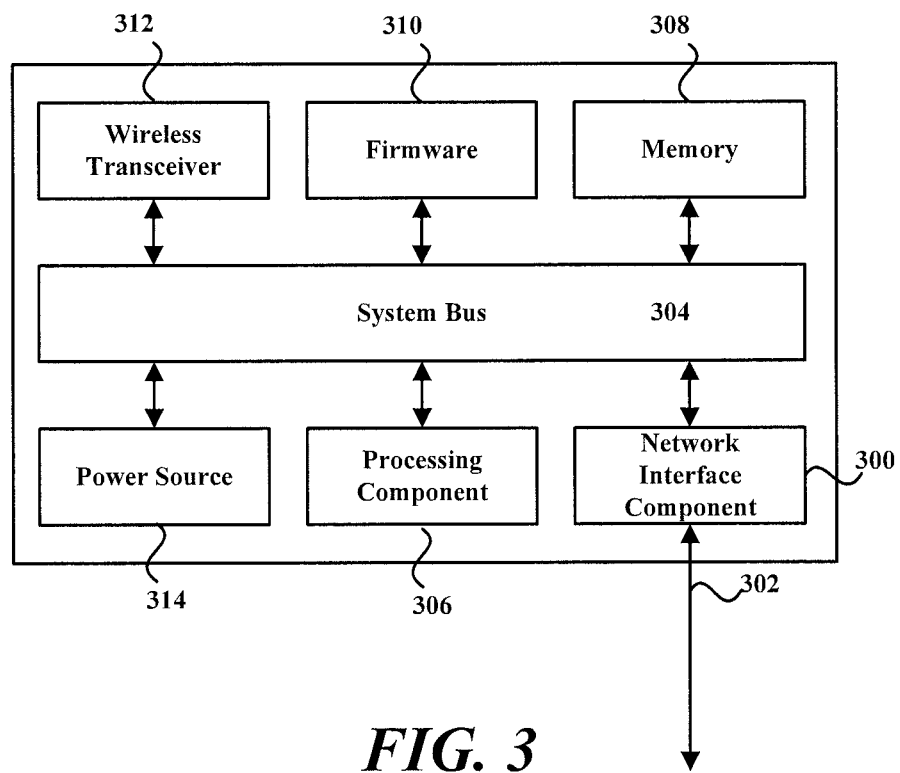
FIG. 3 is a diagram illustrating a beacon, consistent with some embodiments.

FIG. 3 is a diagram illustrating a beacon 108, consistent with some embodiments. As shown in FIG. 3, beacon 108 includes a network interface component (NIC) 300 configured for communication with a network such as network 106 shown in FIG. 1. Consistent with some embodiments, NIC 300 includes a wireless communication component, such as a wireless broadband component, a wireless satellite component, or various other types of wireless communication components including RF, microwave frequency MWF, and/or IR components configured for communication 302 with network 106. Consistent with other embodiments, NIC 300 may be configured to interface with a coaxial cable, a fiber optic cable, a DSL modem, a PSTN modem, an Ethernet device, and/or various other types of wired and/or wireless network communication devices adapted for communication with network 106.

Beacon 108 also includes a system bus 304 for interconnecting various components within beacon 108 and communicating information between the various components. Such components include a processing component 306, which may be one or more processors, micro-controllers, GPUs, DSPs, ASICs, and/or FPGAs, a memory component 308, firmware 310 and one or more wireless transceivers 312 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc. Beacon 108 may also include a power source 314. Power source 314 may be any power source capable of providing sufficient current to power the components of beacon 108. In some embodiments, power source 318 may be a battery, such as a watch battery or button cell.

In some embodiments, beacon 108 may be configured to transmit information using wireless transceivers 312 based on instructions stored in memory 308 and/or firmware 310 executed by processing component 306. The instructions may be stored in memory 308 and/or firmware 310 by directly writing the instructions to memory 308 and/or firmware 310 over communication link 302 to beacon hardware interface 300 or by wirelessly receiving instructions by wireless transceivers 312. In some embodiments, beacon 108 may be configured to transmit information related to checking in to a merchant associated with beacon 108. In some embodiments, beacon 108 may also transmit instructions that when received by client computing device 102 may cause check in application 114 or payment application 116 to be executed by processing component 206 to cause client computing device 102 to perform a check in at the merchant associated with beacon 108. Further, beacon 108 may transfer instructions that, when received by client computing device 102 cause payment application 116 to be executed by processing component to allow user 110 to authorize a payment to be processed by remote server 104. In some embodiments, wireless transceiver 312 may correspond to a BLE transceiver configured to transmit and receive information according to the BLE protocol. In some embodiments, beacon 108 may be a BLE beacon or dongle such as described in U.S. patent application Ser. No. 13/938,860, filed on Jul. 10, 2013 and issued as U.S. Pat. No. 8,972,296 on March 3, the entire contents of which are hereby incorporated by reference in their entirety. Further, BLE beacon 108 may have a design such as shown in U.S. Design Application No. 29/455,720, filed May 23, 2013, and issued as U.S. Design Pat. No. D717,309 on Nov. 11, 2014, the entire contents of which are also incorporated herein by reference in their entirety.

As will be readily appreciated, the foregoing networks, systems, devices, methods and variations thereof can be used to implement an automated check in of users at a cooperating or subscribing establishment, such that subsequent purchase transactions and other activities can be more streamlined and convenient.

Figure 4:
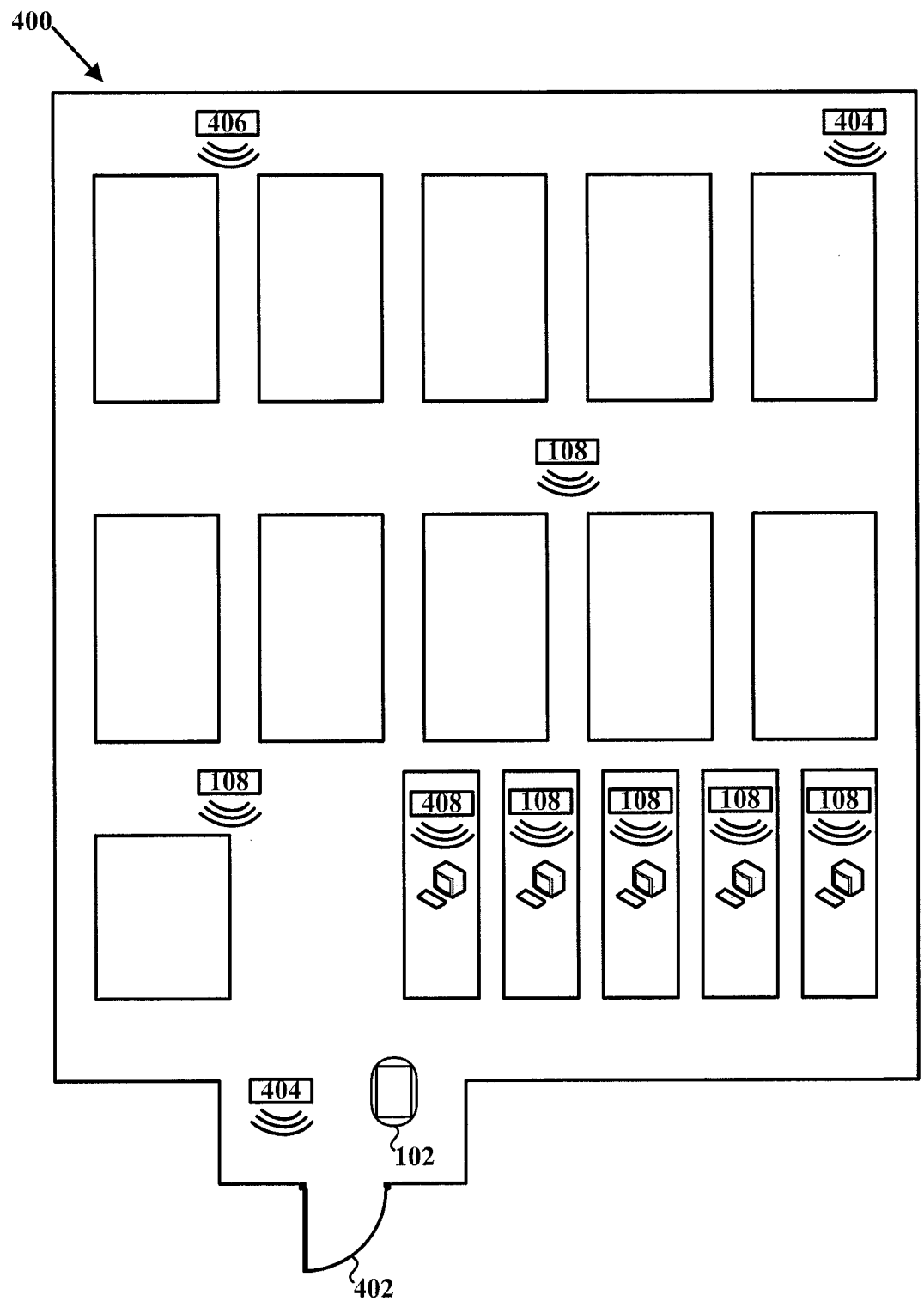
FIG. 4 is a diagram illustrating a location having multiple beacons throughout the location.

FIG. 4 illustrates in block diagram format an exemplary merchant location 400 and associated system components adapted for implementing the purchase of goods or services using automatic wireless consumer check ins according to some embodiments. It will be readily appreciated that this particular layout of merchant location 400 is only provided for purposes of illustration, and that many other types of layouts, devices, procedures and the like could be effectively implemented using the various principles of the present disclosure.

Merchant location 400 includes an indoor store floor having a number of beacons 108. In some embodiments, beacons 108 may be BLE beacons. Beacons 108 may further be in communication with remote server 104 over network 106. These devices can be distributed strategically throughout merchant location, such as near the front door 402, at central locations, and/or at locations of high volume traffic within the establishment. One or more client computing devices 102, such as smartphones, tablets or the like, can interact with one or more of the beacons 108 throughout the location 400. Preferably, just one interaction with a beacon is needed for a check in, although it may be useful for an establishment to know where user 110 is located and/or user 110 travel and shopping patterns or habits within location 400. Such further information can be used to provide further advertising and promotional offers (e.g., related to something at or near where the user is physically located), and/or to authenticate the actual user versus one who may have stolen or is otherwise using the mobile device in an unauthorized fashion. Such further authentication can involve checking known user 110 traffic and shopping patterns against what is currently happening for a given device 102.

An actual automatic check in process can involve a subscribed or affirmatively active user 110 entering a merchant location 400, whereupon client computing device 102 associated with user 110 has a low level background program such as check in application 114 running that detects a low level BLE signal from one or more beacons 108 in the store. Client computing device 102 can then "wake up" and communicate on a more active level with beacon 108. In some embodiments, a unique device identifier and token can be generated and assigned to client computing device 102 for a particular time, location and session, with appropriate expiration and other safeguards in place to protect against fraud or other misuse. For example, a period of anywhere from one to five minutes to one or two hours or longer might suffice for a typical check in session or event. The process of establishing communications between client computing device 102 and beacon 108 and exchanging metadata and a one-time use beacon token to perform a check in is described in U.S. patent application Ser. No. 13/938,860, filed on Jul. 10, 2013 and issued as U.S. Pat. No. 8,972,296 on Mar. 3, 2015, and U.S. patent application Ser. No. 14/021,045, filed on Sep. 9, 2013 and published as U.S. Patent Application Publication No. 2014/0188733, the entire contents of both of these applications which are hereby incorporated by reference in their entirety.

However, parts used to produce beacons 108 may have a limited amount of communications channels that allow for simultaneous communications with devices such as client computing device 102. For example, processing component 306 and wireless transceiver 312 may be currently configured to handle a limited number of simultaneous communications channels such that a beacon 108 may be able to be in communication with, to check in, provide offers, process payments, and the like, with a limited number of client computing device 102. The process of establishing communications between client computing device 102 and a group of coordinated beacons 108 is described in U.S. patent application Ser. No. 14/248,263, filed on Apr. 8, 2014, and published as U.S. Patent Application Publication No. 2015/0072618 on Mar. 12, 2015, the entire contents of this application is hereby incorporated by reference in its entirety.

In particular, current integrated circuits (ICs), and microchips used for current BLE devices may handle a maximum of 37 concurrent data channels. As a result, if more than 37 different client computing devices 102 enter merchant location 400 through door 402, beacon 108 cannot communicate with each of the 37 client computing devices 102, which means that beacon 108 may not be able to check in each of the 37 client computing devices 102 or process payments for facilitate payment processing for each of the client computing devices 102.

Figure 5:
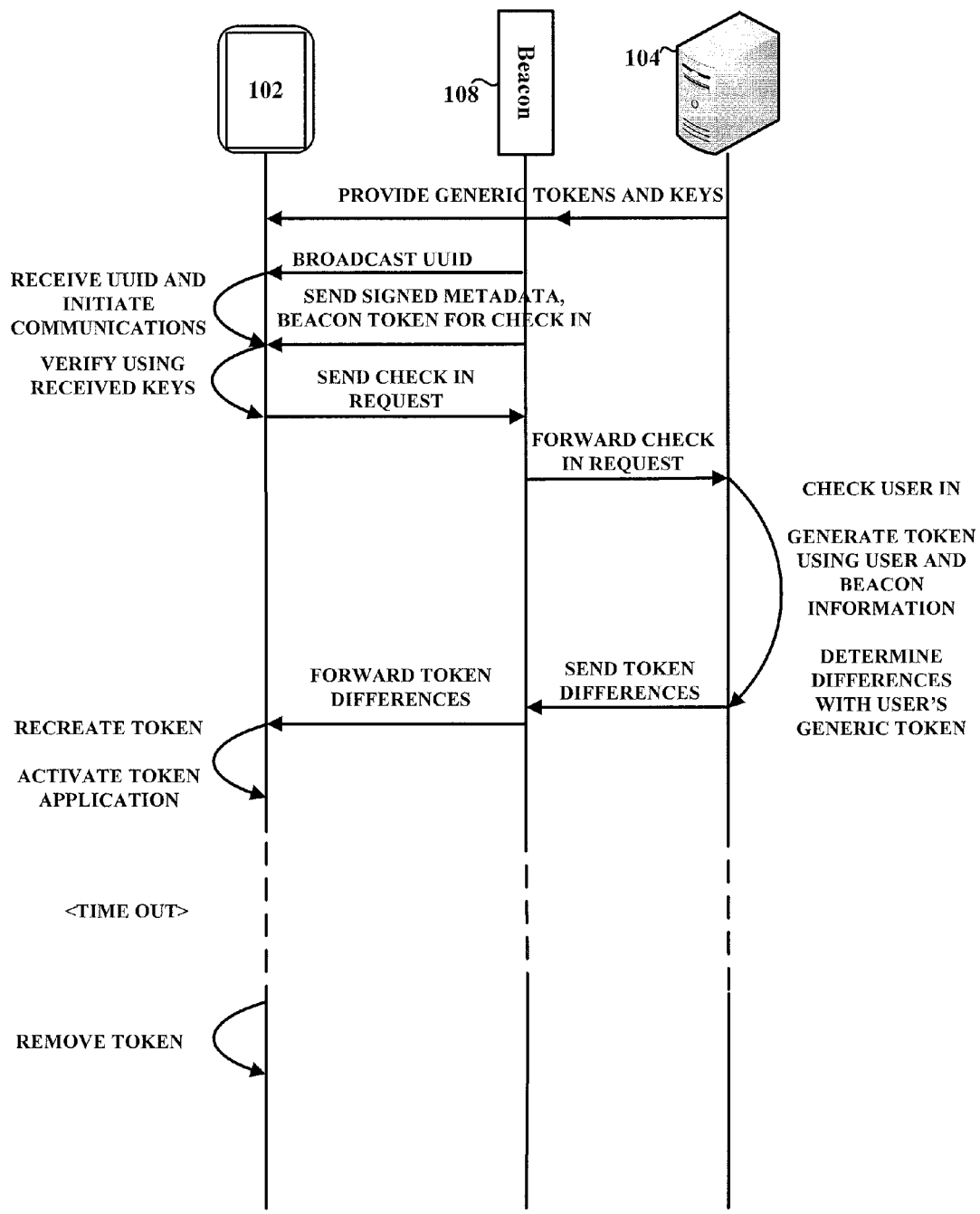
FIG. 5 is a diagram illustrating a flow for reusing generic tokens using a beacon, consistent with some embodiments.

FIG. 5 is a diagram illustrating a flow for reusing generic tokens using a beacon 108, consistent with some embodiments. As shown in FIG. 5, remote server 104 may provide beacon 108 and client computing device 102 with tokens, keys, and/or other identifiers. In some embodiments, the tokens, keys, and identifiers may be one-time use transaction tokens, custom tokens, generic tokens, and associated keys wherein the associated keys may include a pair of symmetric keys and the tokens can each have, for example, a user identifier, a token value, merchant identifiers, location information, date and time stamps, a key serial number, and an AES or other crypto key, and/or the like. In some embodiments, remote server 104 may provide beacon with tokens, keys, and/or identifiers when beacon 108 is set up to work with remote server 104 for checking in users through remote server 104. Remote server 104 may further provide beacon 108 with digital signatures and merchant one-time use tokens that may be used to track check ins and transactions. In some embodiments, tokens, keys, and/or identifiers may be provided to client computing device 102 when user 110, using client computing device 102, signs up for a check in service provided by remote server 104, during account creation, and/or when check in application 114 is installed on client computing device 102.

Beacon 108 may then repeatedly broadcast an identifier. In some embodiments, the identifier may be a universally unique identifier (UUID). The broadcast UUID may be received by client computing device 102 to initiate communications with beacon 108. Beacon 108 may then provide signed metadata, a specific one-time use beacon token, and/or a digital signature associated with the signed metadata to client computing device 102. In some embodiments, client computing device 102 may request the metadata and other information from beacon 108 when communications are initiated with beacon 108. Check in application 114 may be configured to verify the metadata and other information, such as the digital signature as being issued by the service provider, by using a public key received from remote server 104. When the digital signature is verified as authentic, check in application 114 may then provide user 110 with the option to check in. When user 110 checks in, client computing device 102 may then generate a check in request to be sent to beacon 108. In some examples, the check in request may be encrypted using a suitable encryption key. Beacon 108 then forwards the check in request to remote server 104, which decrypts the check in request when it is encrypted. Beacon 108 may also include its UUID or other identifier with the forwarded check in request so that remote server 104 may know the approximate location of user 110 and/or the identity of the merchant or venue associated with beacon 108. The process of checking in by communicating with a BLE beacon, such as beacon 108, is further described in U.S. patent application Ser. No. 13/938,860, filed on Jul. 10, 2013 and issued as U.S. Pat. No. 8,972,296 on Mar. 3, 2015, and U.S. patent application Ser. No. 14/021,045, filed on Sep. 9, 2013 and published as U.S. Patent Application Publication No. 2014/0188733, the entire contents of both of these applications which are hereby incorporated by reference in their entirety.

Remote server 104 may then use the forwarded check in request and/or the identifier of beacon 108 to check in user 110. To verify the identity of user 110, remote server 104 may access account database 122 to validate the user credentials included in the check in request. Once user 110 is checked in, remote server 104 generates a custom token for use by user 110 while user 110 remains in proximity to beacon 108. The custom token may include sufficient user identifying information to identify the user. In some embodiments, the custom token may be generated based on a previously arranged relationship between user 110, the service provider associated with remote server 104, and/or the merchant or venue associated with beacon 108. In some examples, the previously arranged relationship may be associated with an earlier registration and/or account creation between user 110, the service provider, and/or the merchant or venue. The custom token may additionally include information associated with the merchant or venue, such as the merchant or venue name, location of beacon 108, and/or the like. In some examples, the location of the beacon 108 may include a latitude and longitude associated with beacon 108 and previously recorded by remote server 104. The custom token may also include a date and/or time stamp so that an appropriate period of use for the custom token may be established. In some examples, the custom token may also include an identifying image, such as a quick response (QR) code, bar code, or similar, that may be presented on client computing device 102 and scanned by the merchant or venue to communicate that user 110 is in possession of the custom token. The custom token may additionally include a consistency check, such as a CRC code, and/or a digital signature.

Tokens are typically fairly large in size, often being as much as 200 kilobytes to one megabyte or larger in size. The large amount of bandwidth used to transmit a complete custom token back to client computing device 102 through beacon 108 may not be reasonable. For example, many beacons 108 typically support a bandwidth with individual user devices 102 of a few thousand bits per second. Fortunately, large portions of the custom token are typically static and change little or not at all between uses. In some examples, a generic token may be created for each user 110 and service provider or merchant/venue account/relationship that varies by about 500 bytes or so with the custom token created as a result of the check in. This generic token may be provided to client computing device 102 during registration and/or account creation.

In some examples, the differences between the generic token and the custom token may be limited to the merchant or venue name, location, date or time stamp, and/or similar fields that may be associated with one or more details of the current use corresponding to the check-in being processed. The differences between the fields associated with the current use may also have ripple effects on other fields within the custom tokens. In some examples, these other fields may include consistency check, digital signature, and/or similar fields. In some examples, the consistency check, digital, and/or similar fields may be used by beacon 108, client computing device 102, check in application 114, and/or a token management application to verify and/or validate the content of the custom token and/or determine the trustworthiness of the source of the token (e.g., remote server 104). In some examples, the custom token may include an extended certificate chain to further validate the source of the token. In some examples, the certificate chain may be relatively static and may not typically change between issuance of the generic token and creation of the custom token as digital certificates are typically issued by certificate authorities for months or years at a time. Thus, considerable bandwidth may be saved by returning just the differences between the generic token and the custom token to client computing device 102 through beacon 108. For security reasons, the token differences may be encrypted during transmission to client computing device 102.

Once the differences between the generic token and the custom token are determined, remote server 104 may return those differences to beacon 108, which may then forward them to client computing device 102. When client computing device 102 receives the difference, check in application 114 may use the differences and the generic token received during registration or account creation to recreate the custom token. The recreated custom token may then be passed to the token management application for presentation and/or use by user 110.

To provide further security, check in application 114 may additionally include a time out feature. After recreation of the custom token, check in application 114 may start an expiration timer. In some embodiments, the expiration time may be set to a fixed period of time after the time at which the custom token was recreated. In some embodiments, the fixed period of time may be set by policy and/or user preference and may be based on the type and/or desired use of the custom token. In some embodiments, the fixed period of time may vary between one to five minutes to one or two hours or longer. For example, a custom token for a purchase transaction may have a significantly shorter validity period than an admission or entry token. In some examples, the expiration timer may be retriggered and/or reset as long as client computing device 102 remains in proximity to beacon 108. In some examples, remote server 104 may also use an expiration timer to limit the validity period of the custom token so as to deny any action resulting from untimely use of the custom token.

Figure 6:
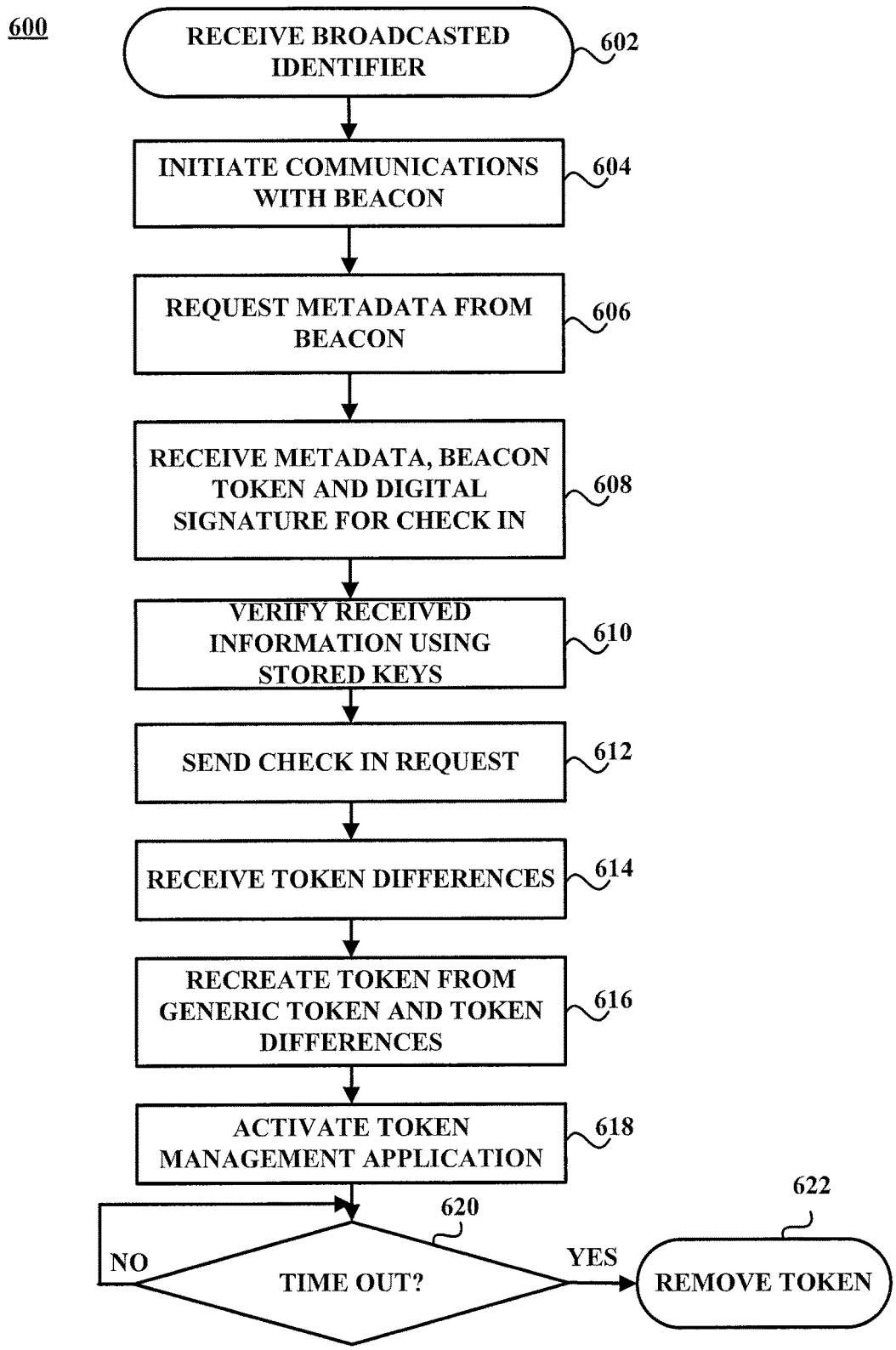
FIG. 6 is a flowchart illustrating a method of reusing a generic token, consistent with some embodiments.
Figure 9:
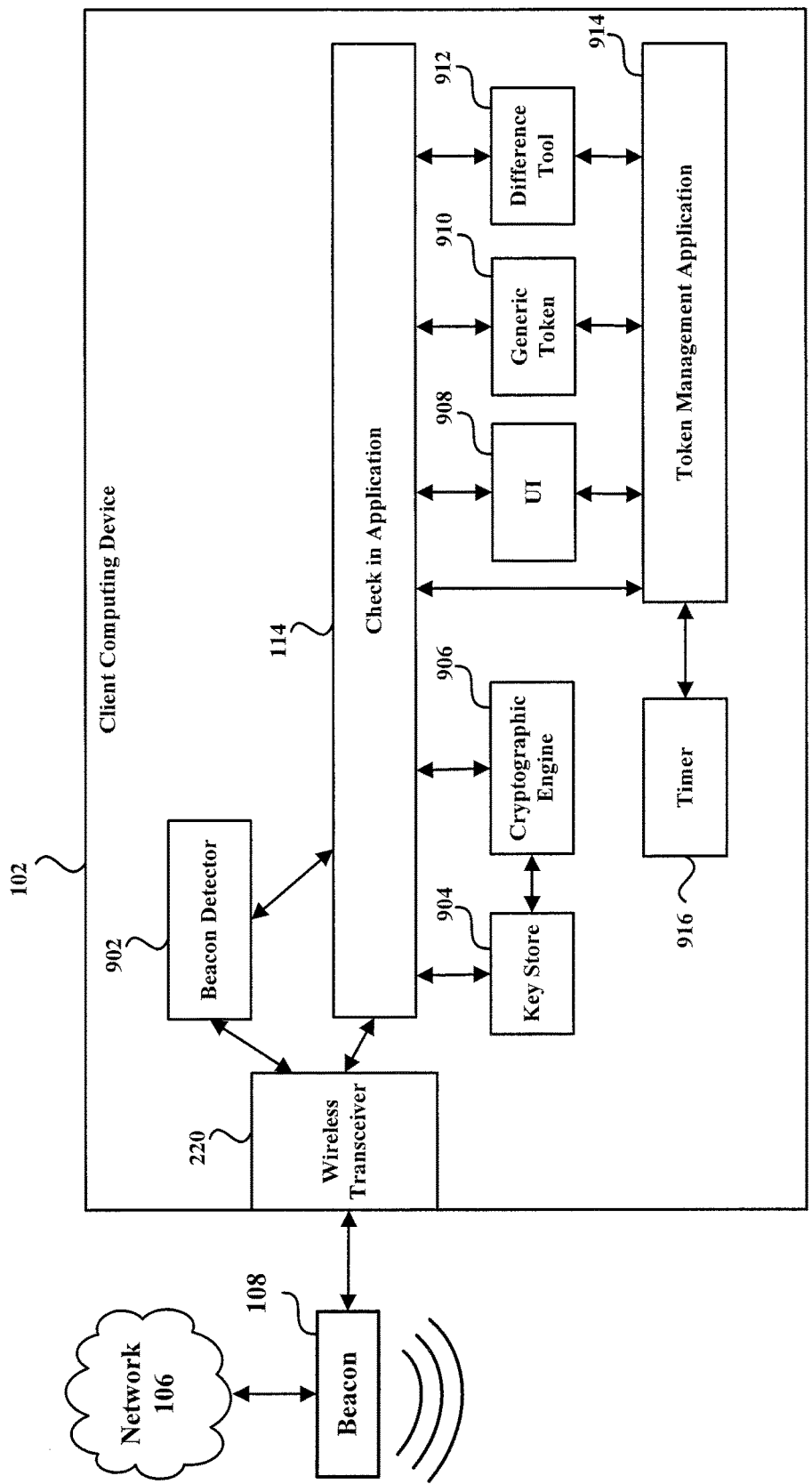
FIG. 9 is a diagram illustrating a client computing device consistent with some embodiments.

FIG. 6 is a flowchart illustrating a method 600 of reusing a generic token, consistent with some embodiments. For the purpose of illustration, FIG. 6 may be described with reference to any of FIGS. 1-5. Method 600 shown in FIG. 6 may be embodied in computer-readable instructions for execution by one or more processors such that one or more of the steps of the method may be performed by processing component 206 of client computing device 102. For the purposes of non-limiting illustration, method 600 is described in the context of FIG. 9, which is a diagram illustrating aspects of client computing device 102 consistent with some embodiments.

As shown in FIG. 6, method 600 may begin with a process 602 where client computing device 102 receives a broadcasted identifier. In some embodiments, client computing device 102 may use a beacon detector 902 to listen for and/or detect identifiers that may be broadcast by a beacon, such as beacon 108. The broadcasted identifier may be a UUID received from one of the beacons 108 in a location 400, including beacons 404, 406, and/or 408. In some embodiments, beacons 108, 404, 406, and 408 may be BLE beacons such that the identifier may be broadcast according to BLE communications protocols. Client computing device 102 may include wireless transceiver 220 that may be capable of communicating with beacon 108 using BLE communication protocols and receiving the broadcasted identifier. In some embodiments, upon detection of beacon 108 by beacon detector 902 by the reception of the broadcasted identifier, beacon detector 902 may notify check in application 114 that client computing device 102 is in proximity to beacon 108.

At a process 604, client computing device 102 may then initiate communications with beacon 108. In some embodiments, check in application 114 may initiate communications with beacon 108 by exchanging one or more messages with beacon 108 using wireless transceiver 220. In some embodiments, check in application 114 of client computing device 102 may verify the broadcasted identifier received during process 602 using one or more tokens, keys, and/or identifiers received during an earlier sign up, registration, enrollment, and/or account creation with remote server 104 and/or during a check in application installation process (not shown). The one or more tokens, keys, and/or identifiers may be stored in memory component 208 of client computing device 102 using a key store 904.

At a process 606, client computing device 102 may then request metadata and other information from beacon 108. This may include check in application 114 of client computing device 102 sending one more messages and/or communication requests to beacon 108. In some embodiments, these messages and/or communication requests may be encrypted. In some embodiments, check in application 114 may use a cryptographic engine 906 to encrypt and/or decrypt the messages and/or communication requests exchanged with beacon 108. In some embodiments, the encryption and/or decryption may use one or more keys stored in key store 904. In some embodiments, these messages may be sent to beacon 108 by wireless transceiver 220 of client computing device 102 using a BLE communication protocol.

At a process 608, client computing device 102 may receive metadata, a beacon token, and a digital signature from beacon 108 in response to the messages and/or communication requests sent during process 606. The response may be received in one or more messages from beacon 108 and may be encrypted as well. In some embodiments, the one or more messages may be decrypted using cryptographic engine 906. In some embodiments, these messages may be received from beacon 108 by wireless transceiver 220 of client computing device 102 using a BLE communication protocol.

At a process 610, client computing device 102 may verify the received information using stored keys. Check in application 114 of client computing device 102 may then verify the received information, including the digital signature, using the keys stored in memory component 208 and/or key store 904 of client computing device 102 and received from remote server 104 during the sign up, registration, enrollment, account creation, and/or application installation process. After verification of the received information, check in application 114 of client computing device 102 may choose to initiate the check in process either automatically or after receiving confirmation to proceed from user 110. For example, client computing device 102 may provide an interactive prompt to user 110 using a user interface 908 displayed on display component 210 of client computing device 102. The interactive prompt may ask user 110 for permission to check in via the check in service associated with beacon 108 and remote server 104. User 110 may be able to accept the check in by interacting with the prompt and user interface 908 by using input component 212, navigation control 214, and display component 210, or a combination thereof as is consistent with the user interface elements used by user interface 908.

At a process 612, check in application 114 of client computing device 102 may send a check in request to beacon 108. In some embodiments, the check in request may be sent to beacon 108 using one or more messages. In some embodiments, the check in request may be sent to beacon 108 by wireless transceiver 220 of client computing device 102 using a BLE communication protocol. In some embodiments, the check in request may be encrypted prior to being sent to beacon 108 using cryptographic engine 906 and one or more encryption keys stored in key store 904.

At a process 614, client computing device 102 may receive token differences from beacon 108. When the check in request sent during process 612 is verified by remote server 104, remote server 104 may create a custom token associated with the check in session. Remote server 104 may then determine differences between the custom token and a generic token 910 that may be known to check-in application 114 and may be stored in memory component 208 of client computing device 102. In some embodiments, check in application 114 of client computing device 102 may have received generic token 910 during the earlier sign up, registration, enrollment, account creation, and/or application installation process. Remote server 104 may then send the token differences to beacon 108 which, in turn, forwards the token differences to client computing device 102 for delivery to check-in application 114.

At a process 616, check in application 114 of client computing device 102 may recreate the custom token from generic token 910 and the token differences. Check in application 114 of client computing device 102 may apply the token differences received during process 614 to generic token 910 stored in memory component 208 to recreate the custom token using a difference tool 912. Difference tool 912 may apply each of the token differences applying to bits, bytes, and/or fields of generic token 910 to recreate the custom token. In some embodiments, these token differences may include changes to the merchant/venue name, location, date/time stamp, consistency check, and/or signature fields of generic token 910 so that it may now be used for an activity associated with beacon 108 and/or the merchant associated with beacon 108. In some embodiments, the recreated custom token may be used to replace generic token 910 stored in memory component 208 or may be used to create a new custom token for storage in memory component 208.

At a process 618, client computing device 102 may activate a token management application 914. After the custom token is recreated during process 616, token management application 914 and/or the token management portion of the check in application 114 is notified that the recreated custom token is available to use. In some embodiments, this notification may be triggered by the update to generic token 910 or the storage of the recreated custom token in the portion of memory component 208 being monitored by the token management application 914. In some embodiments, check in application 114 may make one or more API calls to token management application 914 to notify token management application 914 of the modified or created custom token. Token management application 914 may then use the custom token based on its type and/or content to complete a purchase transaction and/or other operation. In some embodiments, the other operation may include a check-in operation with the merchant, presentation of user and/or user device credentials, generation of an admission or entry token, and/or the like. In some embodiments, token management application 914 may generate and/or display an identifying image such as a QR code or barcode using user interface 908 on display component 210 of client computing device 102 for use by the merchant and/or venue associated with beacon 108. In some embodiments, the identifying image may be displayed automatically without any input or direction from user 110 of client computing device 102 throughout the check in process. In some embodiments, the identifying image may be displayed on a locked home screen of client computing device 102.

At a process 620, client computing device 102 may determine whether a time out period for the recreated custom token is expired. In some embodiments, recreation of the custom token during process 616 and/or activation of token management application 914 during process 618 may include having token management application 914 activate a timer 916. In some embodiments, timer 916 may begin counting down the time out period once it is activated. In some embodiments, timer 916 may generate an interrupt and/or other event at the end of the time out period. In some embodiments, token management application 914 may listen for and/or wait for the interrupt and/or event to know when the time out period is ended. Token management application 914 of client computing device 102 may use the time out period to limit a time period for which the recreated custom token is available for use. In some embodiments, the time out period may be set to a fixed period of time after the time at which the custom token was recreated. In some embodiments, the fixed period of time may be set by policy and/or user preference and may be based on the type and/or desired use of the custom token. In some embodiments, the fixed period of time may vary between one to five minutes to one or two hours or longer. For example, a custom token for a purchase transaction may have a significantly shorter validity period than an admission or entry token. In some examples, the expiration timer 916 may be retriggered and/or reset, such as by beacon detector 902, as long as client computing device 102 remains in proximity to beacon 108. When the time out period is not expired, client computing device 102 repeats monitoring of the time out period using process 620. When the time out period expires, the recreated custom token is removed using a process 622.

At a process 622, client computing device 102 may remove the recreated custom token. To limit the usage period for the recreated custom token, token management application 914 of client computing device 102 removes the recreated custom token after the time out period. In some embodiments, the recreated custom token is removed using difference tool 912 by reversing the application of the token differences received during process 614 to recreate generic token 910 for storage in memory component 208. In some embodiments, the recreated custom token is removed from memory component 208 leaving generic token 910 for use during a future application of method 600.

Figure 7:
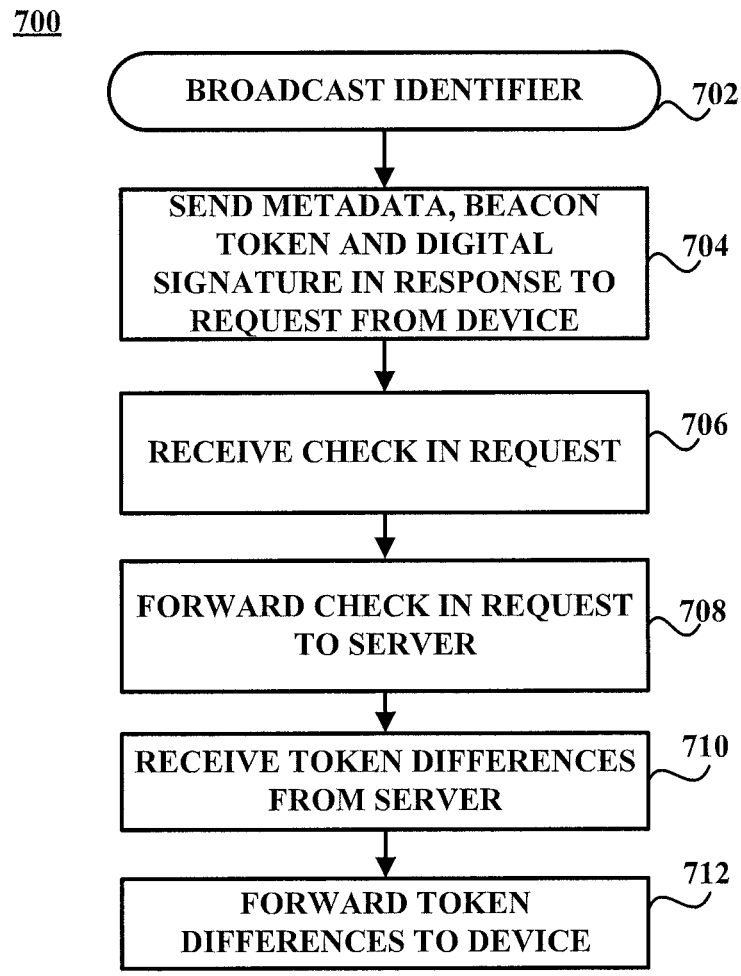
FIG. 7 is a flowchart illustrating a method of reusing a generic token, consistent with some embodiments.

FIG. 7 is a flowchart illustrating a method 700 of reusing a generic token, consistent with some embodiments. For the purpose of illustration, FIG. 7 may be described with reference to any of FIGS. 1-6. Method 700 shown in FIG. 7 may be embodied in computer-readable instructions for execution by one or more processors such that one or more of the steps of the method may be performed by processing component 306 of beacon 108, which may generally refer to any beacon 108 shown in FIG. 4, including beacons 404, 406, and 408. In some embodiments, beacon 108 may use method 700 to act as intermediary between client computing device 102 and remote server 104 to facilitate check in of client computing device 102 with remote server 104 and the delivery of information from remote server 104 to client computing device 102 to facilitate the use of custom tokens by client computing device 102.

At a process 702, beacon 108 may broadcast an identifier. In some embodiments, beacon 108 may be a BLE beacon such that the identifier may be broadcast according to BLE communications protocols. The broadcast identifier may have been received from remote server 104 as part of a setup of beacon 108 in location 400 and may be a UUID. In some embodiments, beacon 108 may broadcast the identifier at repeating intervals so that as different users 110 and client computing devices 102 move into and out of range of beacon 108, each of the client computing devices 102 may be made aware of the existence of beacon 108 and its availability for check in services. In some embodiments, the broadcasted identifier may be the identifier received by client computing device during its corresponding process 602.

At a process 704, beacon 108 may then send metadata, a beacon token, and a digital signature in response to a request received from a client computing device 102 that received the broadcast identifier. In some embodiments, the beacon token, digital signature, and metadata may be received from remote server 104 and stored in memory component 308 and/or firmware 310 during a configuration and/or set-up process (not shown). In some embodiments, the request may be the request sent by client computing device 102 during its corresponding process 606 and the sent metadata, beacon token, and digital signature may be received by client computing device 102 during its corresponding process 608. In some embodiments, the metadata, beacon token, and digital signature may be sent by beacon 108 by network component interface 300 using a BLE communication protocol.

At a process 706, beacon 108 may receive a check in request from client computing device 102. When client computing device 102 is able to verify the metadata, beacon token, and digital signature sent during process 704 and obtains user permission to check in, client computing device 102 may send a check in request to beacon 108. In some embodiments, the check in request may be the check in request sent by client computing device 102 during its corresponding process 612. In some embodiments, the check in request may be received by beacon 108 via network component interface 300 using a BLE communication protocol.

At a process 708, beacon 108 may forward the check in request to remote server 104. In some embodiments, beacon 108 may forward the check in request to remote server 104 using one or more messages sent over network 106.

At a process 710, beacon 108 may receive token differences from remote server 104. When the check in request forwarded during process 708 is verified by remote server 104, remote server 104 may create a custom token associated with the check in session. Remote server 104 may then determine differences between the custom token and a generic token known to be stored in memory component 208 of client computing device 102. In some embodiments, client computing device 102 may have received the generic token during the earlier sign up, registration, enrollment, account creation, and/or application installation process. Remote server 104 may then send the token differences to beacon 108.

At a process 712, beacon 108 may forward the token differences to client computing device 102. The token differences received during process 710 are forwarded to client computing device 102 where they are received by client computing device 102 during its corresponding process 614. In some embodiments, the token differences may be forwarded by beacon 108 via wireless transceiver 312 using a BLE communication protocol.

Although not expressly shown in FIG. 7, beacon 108 may continue to broadcast the identifier using process 702 so that additional client computing devices 102 may perform a check in with remote server 104 and receive token differences corresponding to their respective custom tokens. In some embodiments, the continued broadcasting of the identifier by beacon 108 may be used by client computing device 102 to, in part, determine when the custom token recreated by client computing device 102 is be removed from client computing device 102.

Figure 8:
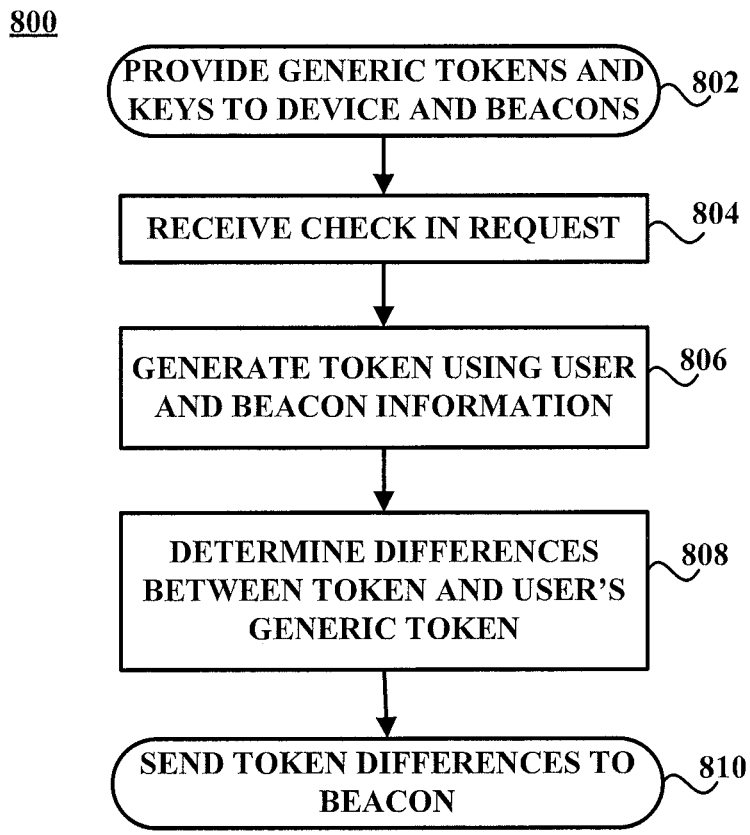
FIG. 8 is a flowchart illustrating a method of reusing a generic token, consistent with some embodiments.
Figure 10:
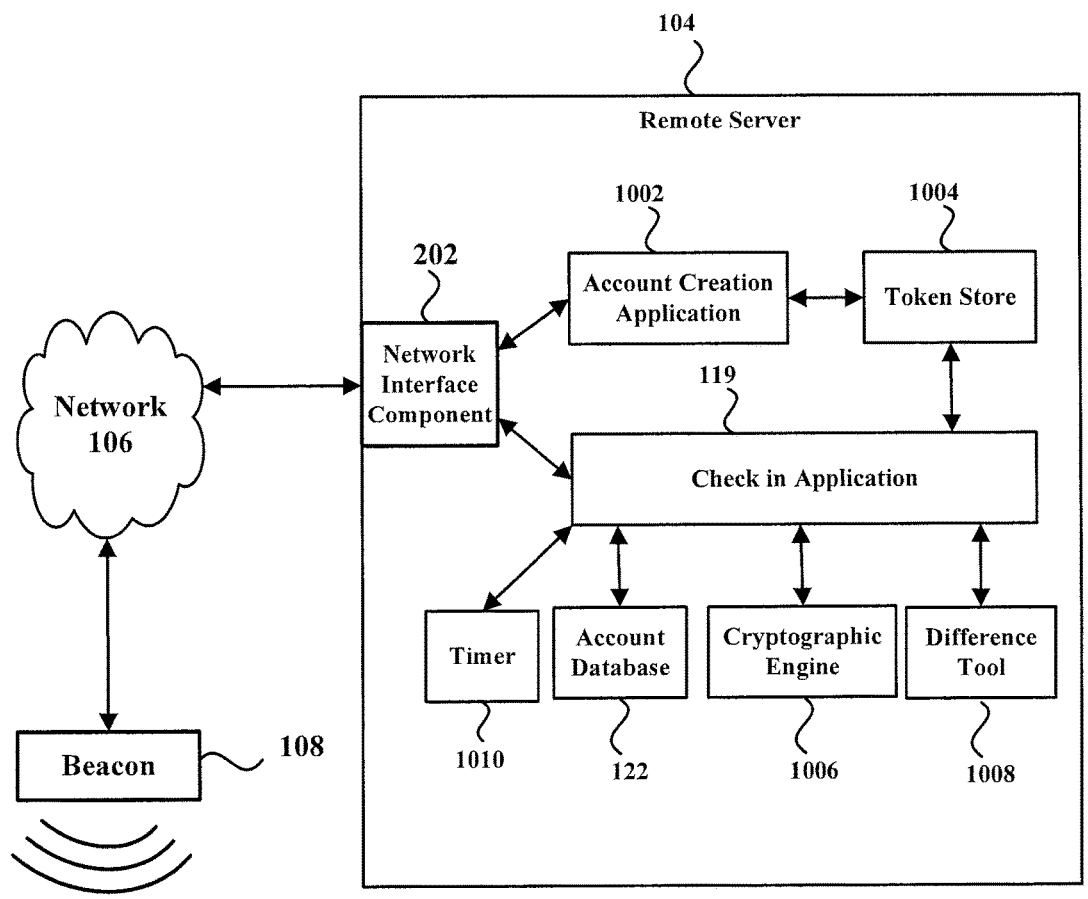
FIG. 10 is a diagram illustrating a remote server consistent with some embodiments.

FIG. 8 is a flowchart illustrating a method 800 of reusing a generic token, consistent with some embodiments. For the purpose of illustration, FIG. 8 may be described with reference to any of FIGS. 1-7. Method 800 shown in FIG. 8 may be embodied in computer-readable instructions for execution by one or more processors such that one or more of the steps of the method may be performed by processing component 206 of remote server 104. For the purposes of non-limiting illustration, method 800 is described in the context of FIG. 10, which is a diagram illustrating aspects of remote server 104 consistent with some embodiments.

At a process 802, remote server 104 may provide one or more tokens, keys, and/or other identifiers to client computing device 102 and/or beacon 108. In some embodiments, remote server 104 may use account creation application 1002 to provide a generic token and keys to client computing device 102 as part of a sign up, registration, enrollment, account creation, and/or application installation process. When user 110 desires to use the check in and transaction services of the service provider associated with remote server 104, user 110 may initiate a sign up, registration, enrollment, and/or account creation process with account creation application 1002 of remote server 104. Upon completion of this process, client computing device 102 of user 110 may be provided with a copy of check in application 114 and/or token management application 914, as well as generic token 910 for use with custom tokens associated with remove server 104 and the associated service provider. In some embodiments, account creation application 1002 of remove server 104 may provide tokens, keys, and/or other identifiers to beacon 108 when beacon 108 is put into communication with remote server 104 using network 106. In some embodiments, account creation application 1002 may exchange one or more messages with client computing device 102 and/or beacon 108 over network 106 using network interface component 202. In some embodiments, account creation application 1002 may store a copy of generic token 910 in a token store 1004 and/or memory component 208.

At a process 804, remote server 104 may receive a check in request from beacon 108. In some embodiments, check in application 119 of remote server 104 may receive the check in request over network 106 and via network interface component 202 in the form of one or more network messages or packets. In some embodiments, the check in request may be encrypted and may be decrypted by check in application 119 using a cryptographic engine 1006. In some embodiments, the check in request may be the check in request sent by check in application 112 of client computing device 102 during the corresponding process 612 of client computing device 102 and forwarded by beacon 108 during the corresponding process 708 of beacon 108. The check in request may include identifiers, keys, and/or signatures sufficient to verify the legitimacy of the check in request and to confirm that client computing device 102 is authorized to receive tokens. In some embodiments, the check in request may include one or more identifiers, keys, and/or signatures, such as a UUID, that are sufficient to identify the merchant and/or venue associated with beacon 108 and/or the location of beacon 108. In some embodiments, check in application 119 of remote server 104 may access account database 122 to compare information in the check in request to a corresponding user account to verify the identity of user 110 of client computing device 102.

At a process 806, check in application 119 of remote server 104 may create a custom token using user and beacon information. Using the contents of the check in request received during process 804 and information associated with beacon 108 that forwarded the check in request to remote server 104, check in application 119 of remote server 104 may create a custom token suitable for use by client computing device 102 to perform a transaction and/or other operation with the merchant or venue associated with beacon 108. In some embodiments, the other operation may include a check-in operation with the merchant, presentation of user and/or user device credentials, generation of an admission or entry token, and/or the like. In some embodiments, the custom token may include information such as the name of the merchant or venue, location of beacon 108, identifying information for user 110 and/or client computing device 102, a date/time stamp, an identifying image such as a QR or bar code, a consistency check, a signature and/or the like.

At a process 808, remote server 104 may determine differences between the custom token and the generic token issued to user 110 or client computing device 102. In some embodiments, the generic token may be generic token 910 provided to client computing device 102 during process 802. In some embodiments, generic token 910 may be retrieved from token store 1004 based on one or more identifiers associated with user 110, client computing device 102, beacon 108, and/or the merchant associated with beacon 108. In some embodiments, check in application 119 of remote server 104 may determine the differences between the custom token and the generic token using a difference tool 1008.

In some embodiments, the differences between the custom token and the generic token may be limited to about 500 bytes or less of the custom token. In some embodiments, the difference between the custom token and the generic token may be determined by a bit-by-bit or byte-by-byte comparison of the custom token and the generic token by difference tool 1008, with the differences including a list of bits or bytes that are different and the differences in their respective values. In some embodiments, the difference between the custom token and the generic token may be determined by a field-by-field (e.g., merchant or venue name field, location field, etc.) comparison between the custom token and the generic token by difference tool 1008, with the differences including a list of fields that are different and the differences in their respective values.

At a process 810, check in application 119 of remote server 104 may send the token differences to beacon 108. In some embodiments, check in application 119 of remote server 104 may create one or more response messages to the check in request received during process 804 that include the token differences determined during process 808. The messages may then be sent to beacon 108 using network interface component 202 and network 106. In some embodiments, the messages may be received by beacon 108 during its corresponding process 710 for forwarding to check in application 114 of client computing device 102 during corresponding process 616.

Although not shown in FIG. 8, check in application 119 of remote server 104 may also make a record of the check in request to record travel and/or shopping patterns of user 110. In some embodiments, the record may be recorded in account data database 122. In some embodiments, check in application 119 of remote server 104 may additionally record the creation of the custom token during process 806 along with sufficient date and time information so that remote server 104 may confirm and/or verify requests sent to remote server 104 from the merchant or venue associated with beacon 108. In some embodiments, remote server 104 may also implement a time out period after which the custom token is no longer considered valid. In some embodiments, check in application 119 of remote server 104 may use a timer 1010 in similar fashion to the way check in application 114 of client computing device 102 uses timer 916 to implement the time out period.

Software, in accordance with the present disclosure, such as program code and/or data, may be stored on one or more machine-readable mediums, including non-transitory machine-readable mediums. For example, some embodiments of client computing device 102, beacon 108, and/or remote server 104 may include non-transient, tangible, machine readable media that include executable code that when run by one or more processors (e.g., processing component 206 and/or 306) may cause the one or more processors to perform the processes of methods 600, 700, and/or 800 as described above. Some common forms of machine readable media that may include the processes of methods 600, 700, and/or 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consistent with some embodiments, there is provided a user device. The user device includes a wireless transceiver, a memory for storing a generic token, and one or more processors coupled to the memory and the wireless transceiver. The wireless transceiver is configured to communicate with a beacon using a Bluetooth® low energy (BLE) communications protocol, receive a beacon identifier from the beacon, send a check in request to the beacon, and receive token differences from the beacon. The processors are configured to recreate a custom token based on the stored generic token and the received token differences and perform an action using the custom token.

In some embodiments, the one or more processors are further configured to verify the beacon before the check in request is sent. In some embodiments, the wireless transceiver is further configured to request metadata from the beacon and receive the requested metadata from the beacon and the one or more processors are further configured to verify the beacon further based on the metadata. In some embodiments, the one or more processors are further configured to provide the recreated custom token to a token management application. In some embodiments, the one or more processors are further configured to initiate a time out period after recreating the custom token and removing the custom token at the end of the time out period. In some embodiments, the time out period is extended while the wireless transceiver remains in communication with the beacon. In some embodiments, the one or more processors are further configured to replace the generic token with the recreated custom token. In some embodiments, the generic token is received from a server when the device is configured to use check in services. In some embodiments, the beacon identifier includes a universally unique identifier (UUID). In some embodiments, the one or more processors are further configured to generate a visual representation of the custom token for display using a user interface. In some embodiments, the visual representation is a quick response (QR) code.

Consistent with some embodiments, there is also provided a method of managing tokens. The method includes communicating with a beacon via a wireless transceiver using a Bluetooth® low energy (BLE) communications protocol, receiving a beacon identifier from the beacon, sending a check in request to the beacon, receiving token differences from the beacon, recreating a custom token based on a generic token stored in a memory and the received token differences, and using the custom token to perform an action.

In some embodiments, the method further includes initiating a time out period after recreating the custom token and removing the custom token at the end of the time out period. In some embodiments, the method further includes extending the time out period while the wireless transceiver remains in communication with the beacon. In some embodiments, the method further includes receiving the generic token from a server when the device is configured to use check in services. In some embodiments, the method further includes generating a visual representation of the custom token for display using a user interface, wherein the visual representation is a quick response (QR) code.

Consistent with some embodiments, there is further provided a non-transitory computer-readable medium. The non-transitory computer-readable medium includes instructions that, when executed by one or more processors, cause the one or more processors to perform a method. The method includes communicating with a beacon via a wireless transceiver using a Bluetooth® low energy (BLE) communications protocol, receiving a beacon identifier from the beacon, sending a check in request to the beacon, receiving token differences from the beacon, recreating a custom token based on a generic token stored in a memory and the received token differences, and using the received token to perform an action.

In some embodiments, the method further includes initiating a time out period after recreating the custom token and removing the custom token at the end of the time out period. In some embodiments, the method further includes extending the time out period while the wireless transceiver remains in communication with the beacon. In some embodiments, the method further includes receiving the generic token from a server when the device is configured to use check in services.

Consistent with some embodiments, there is further provided a communications beacon. The communications beacon includes a wireless transceiver, a network interface component in communication with a remote server over a network, and one or more processors coupled to the network interface component and the wireless transceiver. The wireless transceiver is configured to communicate with a user device using a Bluetooth® low energy (BLE) communications protocol, broadcast a beacon identifier to the user device, receive a check in request from the user device, and forward token differences to the user device. The token differences are usable by the user device to recreate a custom token from a generic token. The network interface is configured to forward the check in request to the remote server and receive the token differences from the remote server. The processors are configured to coordinate operation of the network interface controller and the wireless transceiver.

In some embodiments, the wireless transceiver is further configured to send metadata to the user device in response to a metadata request from the user device. In some embodiments, the network interface component is further configured to receive one or more keys from the remote server during configuration of the beacon. In some embodiments, the beacon identifier includes a universally unique identifier (UUID). In some embodiments, the beacon is a dongle beacon.

Consistent with some embodiments, there is further provided a method. The method includes communicating with a user device via a wireless transceiver using a Bluetooth® low energy (BLE) communications protocol, broadcasting a beacon identifier to the user device, receiving a check in request from the user device, forwarding the check in request to a remote server via a network interface component coupled to the remote server via a network, receiving token differences from the remote server, and forwarding the token differences to the user device. The token differences are usable by the user device to recreate a custom token from a generic token.

Consistent with some embodiments, there is further provided a non-transitory computer-readable medium. The non-transitory computer-readable medium includes instructions that, when executed by one or more processors, cause the one or more processors to perform a method. The method includes communicating with a user device via a wireless transceiver using a Bluetooth® low energy (BLE) communications protocol, broadcasting a beacon identifier to the user device, receiving a check in request from the user device, forwarding the check in request to a remote server via a network interface component coupled to the remote server via a network, receiving token differences from the remote server, and forwarding the token differences to the user device. The token differences are usable by the user device to recreate a custom token from a generic token.

Consistent with some embodiments, there is further provided a server. The server includes a network interface component and one or more processors coupled to the network interface component. The network interface component is configured to receive a check in request from a beacon coupled to the server via a network and send token differences to the beacon for delivery to the user device. The check in request includes information associated with a beacon identifier and a user device communicating with the beacon. The processors are configured to verify the identity of the user device based on the received check in request, create a custom token for use by the user device, and determine the token differences based on differences between the custom token and a generic token assigned to the user device.

In some embodiments, the server is further configured to send the generic token to the user device when the user device is being configured for check in services. In some embodiments, the server is further configured to verify the user device further based on one or more records stored in an account database.

Consistent with some embodiments, there is further provided a method. The method includes receiving a check in request from a beacon coupled to the server via a network. The check in request includes information associated with a beacon identifier and a user device communicating with the beacon. The method further includes verifying the identity of the user device based on the received check in request, creating a custom token for use by the user device, determining token differences based on differences between the custom token and a generic token assigned to the user device, and sending the token differences to the beacon for delivery to the user device.

Consistent with some embodiments, there is further provided a non-transitory computer-readable medium. The non-transitory computer-readable medium includes instructions that, when executed by one or more processors, cause the one or more processors to perform a method. The method includes receiving a check in request from a beacon coupled to the server via a network. The check in request includes information associated with a beacon identifier and a user device communicating with the beacon. The method further includes verifying the identity of the user device based on the received check in request, creating a custom token for use by the user device, determining token differences based on differences between the custom token and a generic token assigned to the user device, and sending the token differences to the beacon for delivery to the user device.

Consequently, embodiments described herein may allow a BLE beacon to facilitate a check in of a user device and the delivery of a custom token to the user device by forwarding differences between the custom token and a corresponding generic token stored on the user device. The embodiments described herein may then allow the BLE beacon to support the distribution of tokens to user devices while reducing the use of user device and/or network resources. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system comprising:
   a non-transitory memory storing a generic token;
   a wireless transceiver; and
   one or more hardware processors coupled to the wireless transceiver and configured to execute instructions to cause the system to perform operations comprising:
   communicating, via the wireless transceiver, with a beacon using a Bluetooth® low energy (BLE) communications protocol;
   receiving, via the wireless transceiver, a beacon identifier from the beacon;
   sending, via the wireless transceiver, a check in request to the beacon; and
   receiving, via the wireless transceiver, token differences from the beacon;
   recreating a custom token based on the generic token and the received token differences; and
   performing an action using the custom token.

2. The system of claim 1, wherein the operations further comprise verifying the beacon before the check in request is sent.

3. The system of claim 2, wherein the operations further comprise:
   requesting, via the wireless transceiver, metadata from the beacon;
   receiving, via the wireless transceiver, the requested metadata from the beacon; and
   verifying the beacon further based on the metadata.

4. The system of claim 1, wherein the operations further comprise providing the recreated custom token to a token management application.

5. The system of claim 1, wherein the operations further comprise initiating a time out period after recreating the custom token and removing the custom token when the time out period expires.

6. The system of claim 5, wherein the time out period is extended while the wireless transceiver remains in communication with the beacon.

7. The system of claim 1, wherein the operations further comprise replacing the generic token with the recreated custom token.

8. The system of claim 1, wherein the generic token is received from a server when the system is configured to use check in services.

9. The system of claim 1, wherein the beacon identifier comprises a universally unique identifier (UUID).

10. The system of claim 1, wherein the operations further comprise generating a visual representation of the custom token for display using a user interface.

11. The system of claim 10, wherein the visual representation is a quick response (QR) code.

12. A method of managing tokens, the method comprising:
   communicating, by a device, with a beacon via a wireless transceiver using a Bluetooth® low energy (BLE) communications protocol;
   receiving, by the device, a beacon identifier from the beacon;
   sending, by the device, a check in request to the beacon;
   receiving, by the device, token differences from the beacon;
   recreating, by the device, a custom token based on a generic token stored in a memory and the received token differences; and
   using, by the device, the custom token to perform an action.

13. The method of claim 12, further comprising:
   initiating a time out period after recreating the custom token; and
   removing the custom token when the time out period expires.

14. The method of claim 13, further comprising extending the time out period while the wireless transceiver remains in communication with the beacon.

15. The method of claim 12, further comprising receiving the generic token from a server when the device is configured to use check in services.

16. The method of claim 12, further comprising generating a visual representation of the custom token for display using a user interface, wherein the visual representation is a quick response (QR) code.

17. A non-transitory machine-readable medium having stored thereon machine-readable instructions executable to cause a machine to perform operations comprising:
- communicating with a beacon via a wireless transceiver using a Bluetooth® low energy (BLE) communications protocol;
- receiving a beacon identifier from the beacon;
- sending a check in request to the beacon;
- receiving token differences from the beacon;
- recreating a custom token based on a generic token stored in a memory and the received token differences; and
- using the custom token to perform an action.

18. The non-transitory machine-readable medium of claim 17, wherein the operations further comprise:
- initiating a time out period after recreating the custom token; and
- removing the custom token when the time out period expires.

19. The non-transitory machine-readable medium of claim 18, wherein the operations further comprise extending the time out period while the wireless transceiver remains in communication with the beacon.

20. The non-transitory machine-readable medium of claim 17, wherein the operations further comprise receiving the generic token from a server when the machine is configured to use check in services.

* * * * *